Patented Aug. 10, 1954

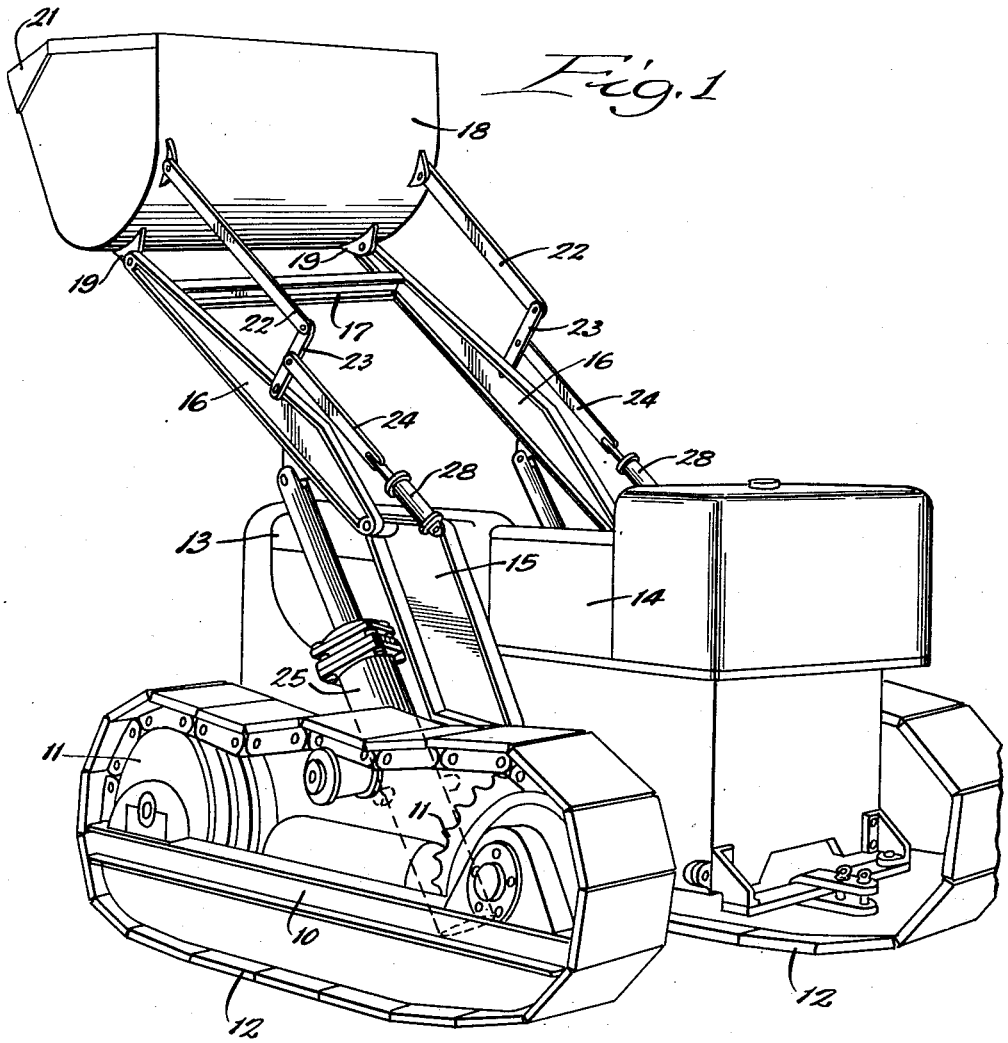

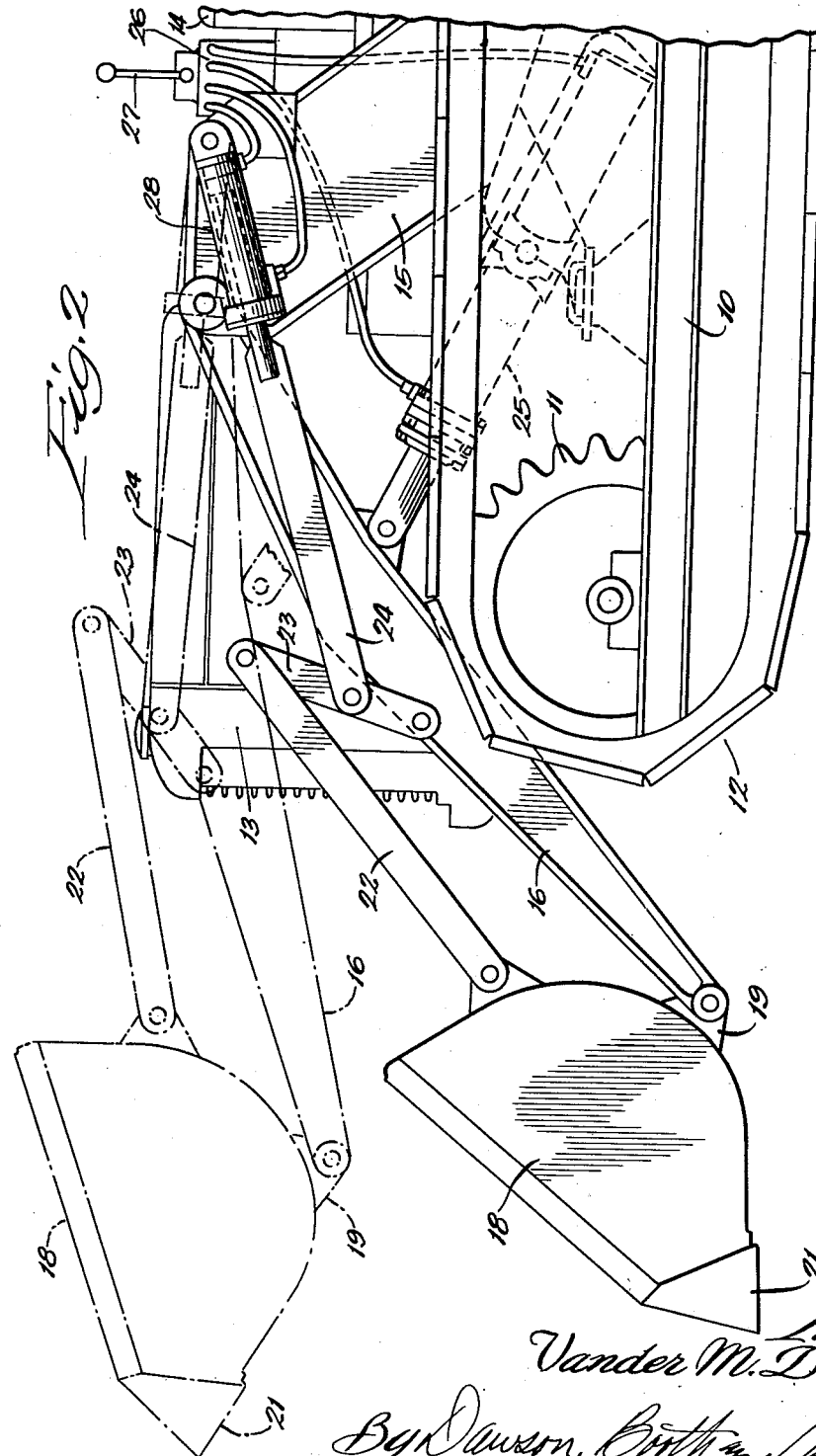

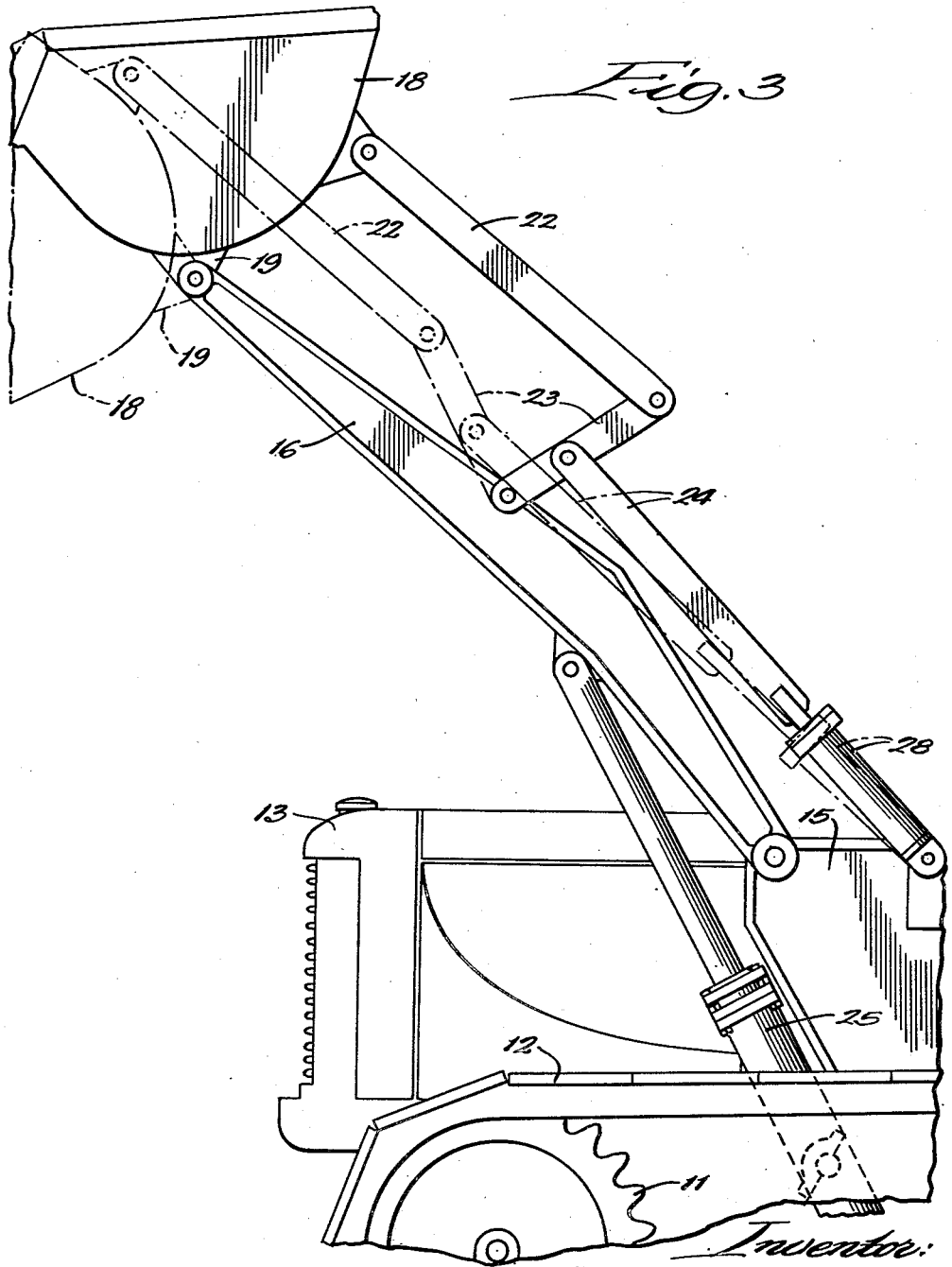

2,685,973

UNITED STATES PATENT OFFICE 2,685,973

MATERIAL HANDLING APPARATUS

Vander M. Dobeus, Highland Park, Ill., assignor to Tractomotive Corporation, Deerfield, Ill., a corporation of Illinois Continuation of application Serial No. 658,155, March 29, 1946. This application July 21, 1951, Serial No. 237,983

4 Claims. (Cl. 214—140)

1

This invention relates to material handling apparatus and more particularly to tractor mounted apparatus for moving earth such as buckets and the like.

Many types of tractor mounted shovels have heretofore been proposed for digging and moving earth and like material. Such apparatus has generally been heavy and complicated; has lacked adequate means for properly controlling the bucket in its cycle of various positions of digging, hoisting, dumping and return to digging; and has interfered with freedom of vision and movement of the operator. It is one of the objects of the present invention to provide an apparatus of this type in which the material handling device is guided and controlled by a linkage formed for convenient mounting on a tractor and which provides maximum flexibility and accuracy of control.

Another object is to provide a material handling apparatus in which the material handling device is controlled by fluid operated rams incorporated in the control linkage in such a manner that the operator is able to vary the rate of discharge during the dumping operation and return the material handling device to its normal digging angle during the operation of lowering it to the ground; thus increasing the efficiency of the unit and lessening the amount of effort on the part of the operator.

Still another object is to provide an apparatus of this type which is relatively light and simple and which provides maximum freedom of vision and movement for the operator.

According to one important feature the linkage is pivoted at horizontally spaced points on the tractor side frames to provide maximum compactness and minimum interference with the operator.

The above and other objects and advantages of the invention will be more readily apparent from the following description when read in connection with the accompanying drawings in which—

Figure 1 is a perspective view of a tractor mounted apparatus embodying the invention;

Figure 2 is a partial side view showing the parts in two different positions; and Figure 3 is a view similar to Figure 2 showing additional positions of the parts.

As illustrated, the apparatus is mounted on a tractor having a main frame indicated generally at 10 which supports sprocket wheels 11 driving an endless track 12. The frame carries a motor enclosed by a hood closure 13 behind which is mounted a seat having arms as

2 seen at 14. Suitable controls for regulating the speed and direction of travel of the tractor are arranged adjacent the seat 14 for easy access by an operator. The motor also drives a hydraulic pump on the tractor for supplying hydraulic operating fluid as is customary in the art.

The apparatus of the invention is adapted to be mounted on the tractor on side frames 15 which are secured to the opposite sides of the tractor and which terminate, as shown, substantially on a level with the top of the hood part 13. It will be observed that the frames 15 do not extend into the space occupied by the operator or by the controls so that they do not interfere in any way with the freedom of vision and movement of the operator.

The side frames 15 support a boom formed by beams 16 which may be of "I" or box section, as desired. As shown, each beam is pivoted at its rear end to the forward part of one of the side frames 15 to extend forwardly therefrom for movement in a vertical plane. The beams 16 may be connected by a cross member 17 which ties the beams rigidly together. Preferably, the beams are of such a length that they will swing past the front end of the tractor, as seen in full lines in Figure 2.

A material handling device shown as a bucket 18 is pivoted through brackets 19 on its bottom to the outer ends of the beams. The bucket may be in the form of the usual digging and moving bucket with an open top and with a cutting lip 21 at one edge to cut into the earth.

The pivotal position of the bucket on the arms 16 is controlled by a pair of guide links 22 pivoted to the rearward side of the bucket above the ears 19 and which lie generally parallel to and above the beams 16. At its rear end each of the links 22 is pivotally connected to the upper end of an arm or lever 23 which is pivoted to the corresponding beam 16 intermediate its ends. The central part of each of the arms 23 is pivoted to a second link 24 which is pivoted to the corresponding frame 15 at a point horizontally to the rear of the beam 16.

The entire boom structure including the bucket is adapted to be raised by hydraulic cylinders 25 pivoted at their lower ends on the main tractor frame or on the side frames 15 and having extensible pistons pivotally connected to the beams 16. The cylinders 25 may be supplied with operating fluid from the hydraulic pump on the tractor under the control of a master valve 26 operated by a hand lever 27 and which determines the admission of liquid to the cylinders 25 to raise the bucket.

The valve 26 may also control the supply and exhaust of fluid to and from the opposite ends of the cylinders 28 which are connected in and form parts of the second links 24. As shown, each cylinder 28 is pivotally connected at one end to one of the side frames 15 and has a piston slidable therein which is connected directly to the link 24. The valve 26 may be controlled by the operator to connect one end of each cylinder 28 to the hydraulic pump and the other end to exhaust or to close both ends of the cylinder so that the cylinder and piston assembly becomes in effect a rigid continuation of the link 24.

In using the device for normal digging operations, the boom structure is lowered to the position shown in Figure 2 so that the bucket will scoop up earth or other materials as the tractor moves forward. At this time the pistons in cylinders 28 are forced completely to the rear ends of the cylinders and are held in this position by closing the valve 26 so that the link 24 is of fixed length. The link 24 holds the arm 23 substantially in the position shown so that the link 22 will tilt the bucket 18 to the proper digging position and will hold it in this position during the digging and filling operation.

When the bucket 18 is filled liquid may be supplied to the cylinders 25 to elevate the bucket to the position shown in dotted lines in Figure 2. Due to the location of the pivots for the beams 16 and pistons 28 in a substantially horizontal line, and to the effect of the link 23, there will be very little relative longitudinal movement between the links 24 and the beams 16 so that the bucket 18 will pivot to a very slight extent about its connection to the beams 16. Therefore, in the initial raising of the bucket it will be tilted backwards slightly so that material in the bucket will not tend to spill from it.

As the bucket is elevated further to the position shown in full lines in Figure 3, the link 24 will tend to move forward relative to the beams 16 due to the locations of the pivots. This will swing the arm 23 counter-clockwise to tilt the bucket slightly counter-clockwise relative to the beams so that it will be held in an upright position and material will not spill from the back edge thereof. Figure 3 illustrates the bucket in full elevated position for loading the material therein on trucks or the like. To dump the bucket from the position shown in Figure 3, fluid may be admitted to the rear ends of the cylinders 28 causing the pistons to move forward therein and moving the links 24 outward toward the bucket. This movement swings the arms 23 counter-clockwise and tilts the bucket counter-clockwise to its emptying position, as shown in dotted lines in Figure 3. It will be seen that the bucket can be dumped in the same manner in any position of elevation as required by the particular use involved. In any case dumping of the bucket is under full control of the operator at all times, and if necessary, he can even shake the bucket to dislodge its contents by rapidly moving the valve 26 to move the bucket from the full line to the dotted line position, as shown in Figure 3.

In many cases it is desired to fill the bucket at different levels with respect to the surface on which the tractor is operating as, for example, in picking up material from a pile. For this use the boom structure can be raised to the desired elevation through the cylinders 25 and the bucket can easily be turned to the proper angle for filling by admitting fluid to the cylinders 28. With the bucket at the proper angle and elevation the valve 26 may be closed so that the bucket will be held by the trapped liquid in the cylinders. At this time the bucket may be filled easily from an elevation higher than that on which the tractor is operating and may be dumped either at the same or different elevations, as required.

This application is a continuation of my co-pending application Serial No. 658,155 filed March 29, 1946, now abandoned.

While one embodiment of the invention has been shown and described in detail, it will be understood that it is illustrative only and is not intended to be taken as a definition of the scope of the invention, reference being had for this purpose to the appended claims.

What is claimed is:

1. A material handling apparatus for use on a tractor having side frames comprising a pair of elongated beams pivoted on horizontal axes on the side frames respectively and extending forward therefrom, a material handling device pivoted to the forward end of the beams to be moved bodily thereby, control links lying above and parallel to the beams and pivoted to the material handling device at points spaced above its connection to the beams, arms pivoted at one end to the beams respectively intermediate their ends and at their other ends to the control links, second links connecting the central parts of the arms to the side frames at points spaced horizontally to the rear from the connections of the beams thereto, and expansible fluid motors in the second links to vary their effective lengths thereby to tilt the material handling device on the beams.

2. In a loader for use in a tractor vehicle, the combination of an elongated supporting beam pivotally mounted at one end on a horizontal axis on said vehicle, a digging bucket pivotally carried at the outer end of said supporting beam, means for raising and lowering said supporting beam, means for tilting said bucket relative to said supporting beam comprising a lever pivotally connected to said supporting beam intermediate the ends thereof, a link connecting the bucket to a point on said lever spaced from its pivotal connection to the supporting beam, an extensible link connecting a second point on said lever spaced from both said first named point and the pivotal connection between the lever and the supporting beam with a fixed pivot point on the tractor vehicle spaced from the pivoted connection of said supporting beam with said vehicle, and hydraulic means for extending said extensible link to vary the digging angle of the bucket and to tilt the bucket to dumping position.

3. In a material handling apparatus for use in a tractor vehicle, a beam formed at one end for mounting on a horizontal pivot on the vehicle, means connected to the beam to swing it in a vertical plane, a material handling device pivotally mounted on the outer end of the beam, a control link extending generally lengthwise of the beam and pivotally connected to the material handling device at a point spaced vertically from its mounting on the beam, an arm pivoted at spaced points in its length to the beam intermediate its ends and to the control link respectively, a second link pivoted at one end to the arm at a third point spaced from both of said spaced points and at its other end to a horizontal pivot spaced horizontally from the first named horizontal pivot and fixed relative thereto, and an extensible fluid motor connected in said second link to vary its effective length, a line between the last named horizontal pivot and the pivotal connection of the control link to the material handling device crossing from one side to the other of the first named horizontal pivot as the beam is raised whereby the material handling device will be tipped first backward and then forward as the beam is raised.

4. In a material handling apparatus for use in a tractor vehicle, a frame on the vehicle, a beam pivoted on the frame on a horizontal axis and extending forward therefrom, a material handling device pivoted on the forward end of the beam, a control link lying generally parallel to the beam and pivoted to the material handling device at a point spaced above its connection to the beam, an arm pivoted at one end to the beam intermediate its ends and at its other end to the link, a second link connecting the central part of the arm to the frame at a point spaced horizontally to the rear of the connection of the beam to the frame, and an extensible fluid motor connected in the second link to vary its effective length.

References Cited in the file of this patent

UNITED STATES PATENTS

| Number | Name | Date |
|---|---|---|
| 947,964 | Collins et al. | Feb. 1, 1910 |
| 2,242,860 | Huelle | May 20, 1941 |
| 2,348,899 | Guignard et al. | May 16, 1944 |
| 2,383,686 | Ryan | Aug. 28, 1945 |
| 2,407,593 | Watson | Sept. 10, 1946 |
| 2,412,323 | Conrad | Dec. 10, 1946 |
| 2,412,570 | Ender | Dec. 17, 1946 |
| 2,418,251 | Drott | Apr. 1, 1947 |

FOREIGN PATENTS

| Number | Country | Date |
|---|---|---|
| 35,087 | France | June 18, 1929 |
| | (Addition to No. 649,020) | |